United States Patent
Ogata et al.

(10) Patent No.: US 12,545,261 B2
(45) Date of Patent: Feb. 10, 2026

(54) ON-VEHICLE APPARATUS, ROAD SURFACE IMAGE TRANSMISSION METHOD, AND RECORDING MEDIUM STORING PROGRAM

(71) Applicant: NEC Corporation, Tokyo (JP)

(72) Inventors: Kazuki Ogata, Tokyo (JP); Shintaro Chiku, Tokyo (JP); Yoko Tanaka, Tokyo (JP); Yuki Tsuji, Tokyo (JP); Kosei Kobayashi, Tokyo (JP); Kei Yanagisawa, Tokyo (JP); Natsumi Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 266 days.

(21) Appl. No.: 18/274,671

(22) PCT Filed: Jan. 29, 2021

(86) PCT No.: PCT/JP2021/003148
§ 371 (c)(1),
(2) Date: Jul. 27, 2023

(87) PCT Pub. No.: WO2022/162855
PCT Pub. Date: Aug. 4, 2022

(65) Prior Publication Data
US 2024/0092366 A1    Mar. 21, 2024

(51) Int. Cl.
*B60W 40/06*   (2012.01)
*G06V 20/56*   (2022.01)

(52) U.S. Cl.
CPC .......... *B60W 40/06* (2013.01); *G06V 20/588* (2022.01); *B60W 2420/403* (2013.01);
(Continued)

(58) Field of Classification Search
CPC ............ B60W 40/06; B60W 2556/10; B60W 2556/45; B60W 2552/35; B60W 2420/403; G06V 20/588
See application file for complete search history.

(56) References Cited

U.S. PATENT DOCUMENTS 8,058,980 B2 *   11/2011   Yanagi .................... B60R 1/28
                                                            382/104
9,233,644 B2 *    1/2016   Shimomura ............. G01C 7/04
(Continued)

FOREIGN PATENT DOCUMENTS

JP    2007-072667 A    3/2007
JP    2009-081666 A    4/2009
(Continued)

OTHER PUBLICATIONS

JP Office Communication for JP Application No. 2022-577935, mailed on Nov. 19, 2024 with English Translation.
(Continued)

*Primary Examiner* — Peter D Nolan
*Assistant Examiner* — Wae L Louie
(74) *Attorney, Agent, or Firm* — Sughrue Mion, PLLC

(57) ABSTRACT

An on-vehicle apparatus includes an abnormal section determination part that determines a road section having a road surface on which an abnormality is probably present, based on an output value of a sensor mounted on a vehicle, an image selection part that selects an image(s) including the determined road section from a plurality of images shot at predetermined time intervals by a camera mounted on the vehicle, and a transmission part that is able to transmit the selected image(s) to a predetermined server.

14 Claims, 17 Drawing Sheets

(52) U.S. Cl.
CPC ..... *B60W 2552/35* (2020.02); *B60W 2556/10* (2020.02); *B60W 2556/45* (2020.02)

(56) References Cited

U.S. PATENT DOCUMENTS

| | | | |
|---|---|---|---|
| 10,832,426 B2* | 11/2020 | Aikin | G06V 20/58 |
| 2009/0079553 A1* | 3/2009 | Yanagi | B60R 1/26 |
| | | | 348/148 |
| 2013/0169794 A1* | 7/2013 | Shimomura | E01C 23/01 |
| | | | 348/128 |
| 2018/0362048 A1* | 12/2018 | Juno | E01C 23/01 |
| 2019/0228228 A1 | 7/2019 | Tsukahara | |
| 2019/0329786 A1* | 10/2019 | Kimura | B60W 40/072 |
| 2021/0303875 A1* | 9/2021 | Bangalore Ramaiah | ................... |
| | | | G06V 20/58 |
| 2023/0063930 A1* | 3/2023 | Ichida | B60W 60/0053 |
| 2023/0106644 A1* | 4/2023 | Shenfeld | G01C 21/1656 |
| | | | 701/26 |
| 2024/0001931 A1* | 1/2024 | Kurano | B60W 40/13 |
| 2024/0092366 A1* | 3/2024 | Ogata | G06V 20/56 |
| 2024/0247944 A1* | 7/2024 | Barrera | G01C 21/3602 |

FOREIGN PATENT DOCUMENTS

| | | |
|---|---|---|
| JP | 2013-139672 A | 7/2013 |
| JP | 2018-041123 A | 3/2018 |
| JP | 2018-120409 A | 8/2018 |
| JP | 2019-196680 A | 11/2019 |
| JP | 2020-180437 A | 11/2020 |
| JP | 2021-002163 A | 1/2021 |
| WO | 2013/084287 A1 | 6/2013 |
| WO | 2017/145928 A1 | 8/2017 |

OTHER PUBLICATIONS

International Search Report for PCT Application No. PCT/JP2021/003148, mailed on Mar. 2, 2021.

* cited by examiner

FIG. 7

| FILE NAME | SHOOTING DATE AND TIME | ... |
|---|---|---|
| 20201028130000.jpg | 10/28/2020 13:00:00 | ... |
| 20201028130001.jpg | 10/28/2020 13:00:01 | ... |
| 20201028130002.jpg | 10/28/2020 13:00:02 | ... |
| ... | ... | ... |

ON-VEHICLE APPARATUS, ROAD SURFACE IMAGE TRANSMISSION METHOD, AND RECORDING MEDIUM STORING PROGRAM

This application is a National Stage Entry of PCT/JP2021/003148 filed on Jan. 29, 2021, the contents of all of which are incorporated herein by reference, in their entirety.

FIELD

The present invention relates to an on-vehicle apparatus, a road surface image transmission method, and a recording medium storing a program.

BACKGROUND

In recent years, attempts have been made to inspect roads more efficiently by measuring a road surface state using a vehicle having a communication function and collecting data from this vehicle, in addition to using a dedicated road surface condition measurement vehicle. For example, Patent Literature (PTL) 1 discloses a road abnormality collection system that can shorten the time required to determine road areas that need to be repaired. Concretely, PTL 1 discloses that an on-vehicle apparatus in this road abnormality collection system includes means for recording driving history data of the vehicle while this vehicle is running on a road, means for detecting an abnormality on the road while the vehicle is running on the road, means for determining the abnormal location on the road based on the detected abnormality on the road and the driving history data of the vehicle and reporting the abnormal location, and means for transmitting, to a management center, an image of the determined abnormal location on the road, the image having been shot by a camera, along with location information about the determined abnormal location on the road. Furthermore, the management center includes road abnormality accumulation means for storing and accumulating the image of the abnormal location on the road and the location information transmitted from the on-vehicle apparatus.

PTL 2 discloses a center-side system and a vehicle-side system that enable a vehicle to grasp a damaged road before the vehicle runs on the road. According to PTL 2, the center-side system includes a center-side reception part that receives vehicle vibration information, which is information about vibration caused in a probe vehicle, and probe vehicle location information, which is information about the location of the probe vehicle, from the vehicle-side system. In addition, the center-side system includes a traffic status estimation part that estimates a damaged road based on the vehicle vibration information and the probe vehicle location information received by the center-side reception part and a center-side transmission part that transmits an estimation result obtained by the traffic status estimation part to the outside.

PTL 1: Japanese Patent Kokai Publication No: 2007-72667

PTL 2: WO2013/084287

SUMMARY

Technical Problem

The following analysis has been made by the present inventors. According to PTL 1, an abnormal part on a road is detected based on an abnormality in acceleration, for example, when a vehicle passes on an abnormal part on a road. However, because the on-vehicle camera is oriented in the forward direction of the vehicle, there is a problem that the on-vehicle camera cannot shoot a local abnormality on a road by image shooting after detection of an abnormality. Thus, although an abnormality on a road can be detected, there arises a case in which a road administrator needs all the way to visit and inspect the site in question. For example, in the case of PTL 1, too, a user visits a site where an abnormality is present, shoots an image of the damaged part on the road with a digital camera or the like, and transmits the image shot with the digital camera or the like to the management center via an on-vehicle apparatus (see paragraphs 0024-0025).

PTL 2 does not take the above point into account, either. Although estimation on a damaged road is performed based on the vehicle vibration information and the vehicle location information, PTL 2 does not discuss a function of shooting an image of the local abnormality on the road at all.

It is an object of the present invention to provide an on-vehicle apparatus, a road surface image transmission method, and a recording medium storing a program that contribute to facilitation of diagnosis of an abnormality on a road based on an image(s) received from a vehicle.

Solution to Problem

According to a first aspect, there is provided an on-vehicle apparatus, including: an abnormal section determination part that determines a road section having a road surface on which an abnormality is probably present, based on an output value of a sensor mounted on a vehicle; an image selection part that selects an image(s) including the determined road section from a plurality of images shot at predetermined time intervals by a camera mounted on the vehicle; and a transmission part that transmits the selected image(s) to a predetermined server.

According to a second aspect, there is provided a road surface image transmission method performed by an on-vehicle apparatus of a vehicle on which a camera and a sensor are mounted, including: determining a road section having a road surface on which an abnormality is probably present, based on an output value of the sensor; selecting an image(s) including the determined road section from a plurality of images shot at predetermined time intervals by the camera; and transmitting the selected image(s) to a predetermined server. This method is associated with a certain machine, which is an on-vehicle apparatus of a vehicle on which a camera and a sensor are mounted.

According to a third aspect, there is provided a computer program (hereinafter, a "program") for realizing the functions of the above on-vehicle apparatus. This program is inputted to a computer apparatus via an input device or a communication interface from the outside, is stored in a storage device, and drives a processor in accordance with predetermined steps or processing. In addition, the program can display, as needed, a processing result including an intermediate state per stage on a display device or can communicate with the outside via the communication interface. For example, the computer apparatus for this purpose typically includes a processor, a storage device, an input device, a communication interface, and as needed, a display device, which can be connected to each other via a bus. In addition, this program can be recorded in a computer-readable (non-transitory) storage medium.

According to the present invention, it is possible to facilitate diagnosis of an abnormality on a road based on an image(s) received from a vehicle.

BRIEF DESCRIPTION OF DRAWINGS

FIG. 7 is a diagram illustrating an example of image information accumulated in an image accumulation part of the on-vehicle apparatus according to the first example embodiment of the present invention.

DESCRIPTION OF EMBODIMENTS

Figure 1:
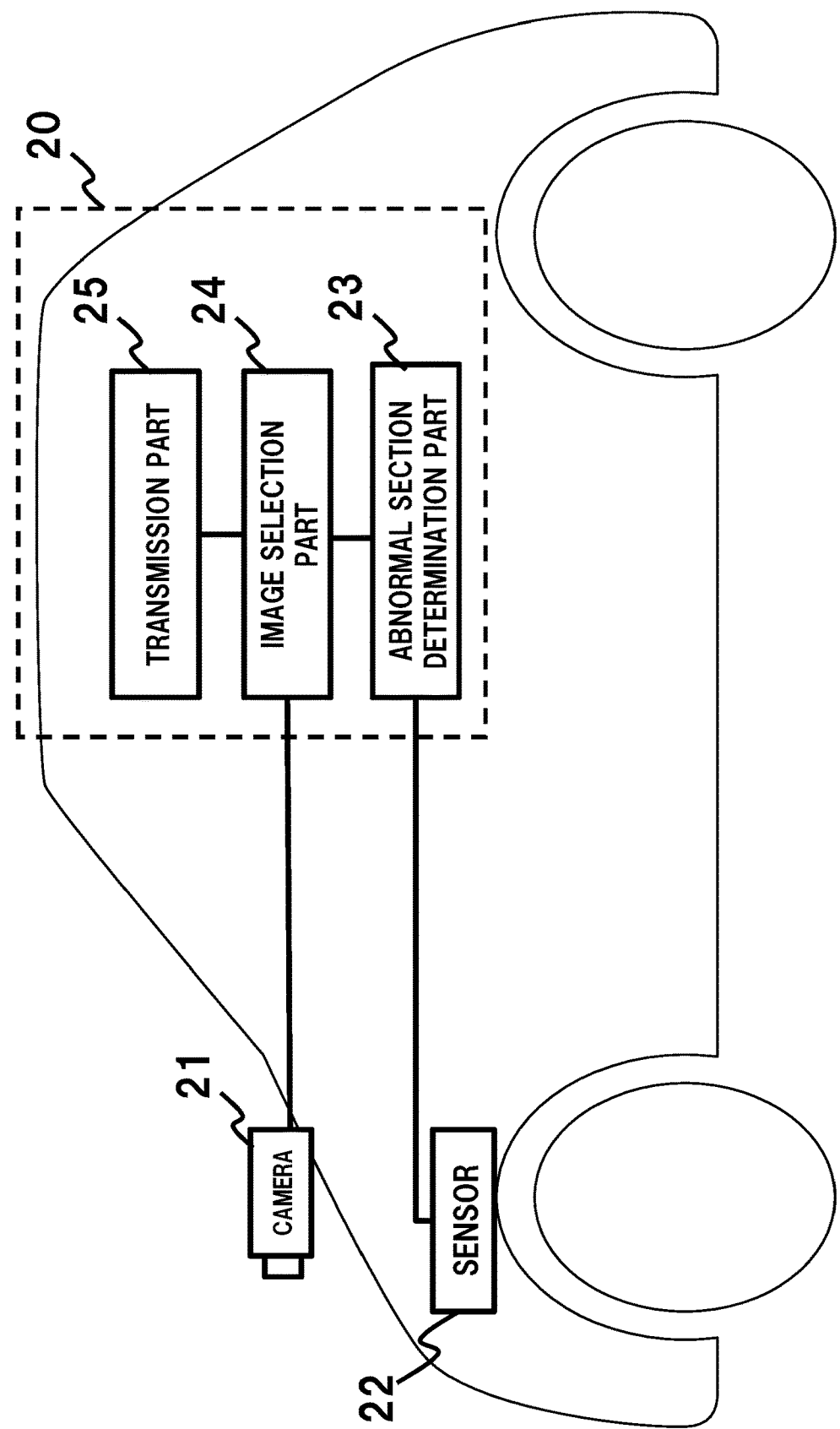
FIG. 1 is a diagram illustrating a configuration according to an example embodiment of the present invention.

First, an outline of an example embodiment of the present invention will be described with reference to drawings. Note, in the following outline, reference signs of the drawings are denoted to each element as an example for the sake of convenience to facilitate understanding and description of this outline is not intended to any limitation. An individual connection line between blocks in the drawings, etc., referred to in the following description includes both one-way and two-way directions. A one-way arrow schematically illustrates a principal signal (data) flow and does not exclude bidirectionality. A program is executed via a computer apparatus, and the computer apparatus includes, for example, a processor, a storage device, an input device, a communication interface, and as needed, a display device. In addition, this computer apparatus is configured such that the computer apparatus can communicate with its internal device or an external device (including a computer) via the communication interface in a wired or wireless manner. In addition, although a port or an interface is present at an input/output connection point of an individual block in the relevant drawings, illustration of the port or the interface is omitted.

As illustrated in FIG. 1, in an example embodiment, the present invention can be realized by an on-vehicle apparatus 20 including an abnormal section determination part 23, an image selection part 24, and a transmission part 25.

More concretely, the abnormal section determination part 23 determines a road section having a road surface on which an abnormality is probably present, based on an output value of a sensor 22 mounted on a vehicle.

The image selection part 24 selects an image(s) including the determined road section from a plurality of images shot at predetermined time intervals by a camera 21 mounted on the vehicle. Note that the image(s) shot by the camera 21 may be a moving image. In that case, a plurality of frames making up the moving image are used.

Furthermore, if this moving image has been encoded by using a frame prediction method, an I frame that is closest to an intended timing may be selected. The transmission part 25 is configured to be able to transmit the selected image(s) to a predetermined server.

Figure 2:
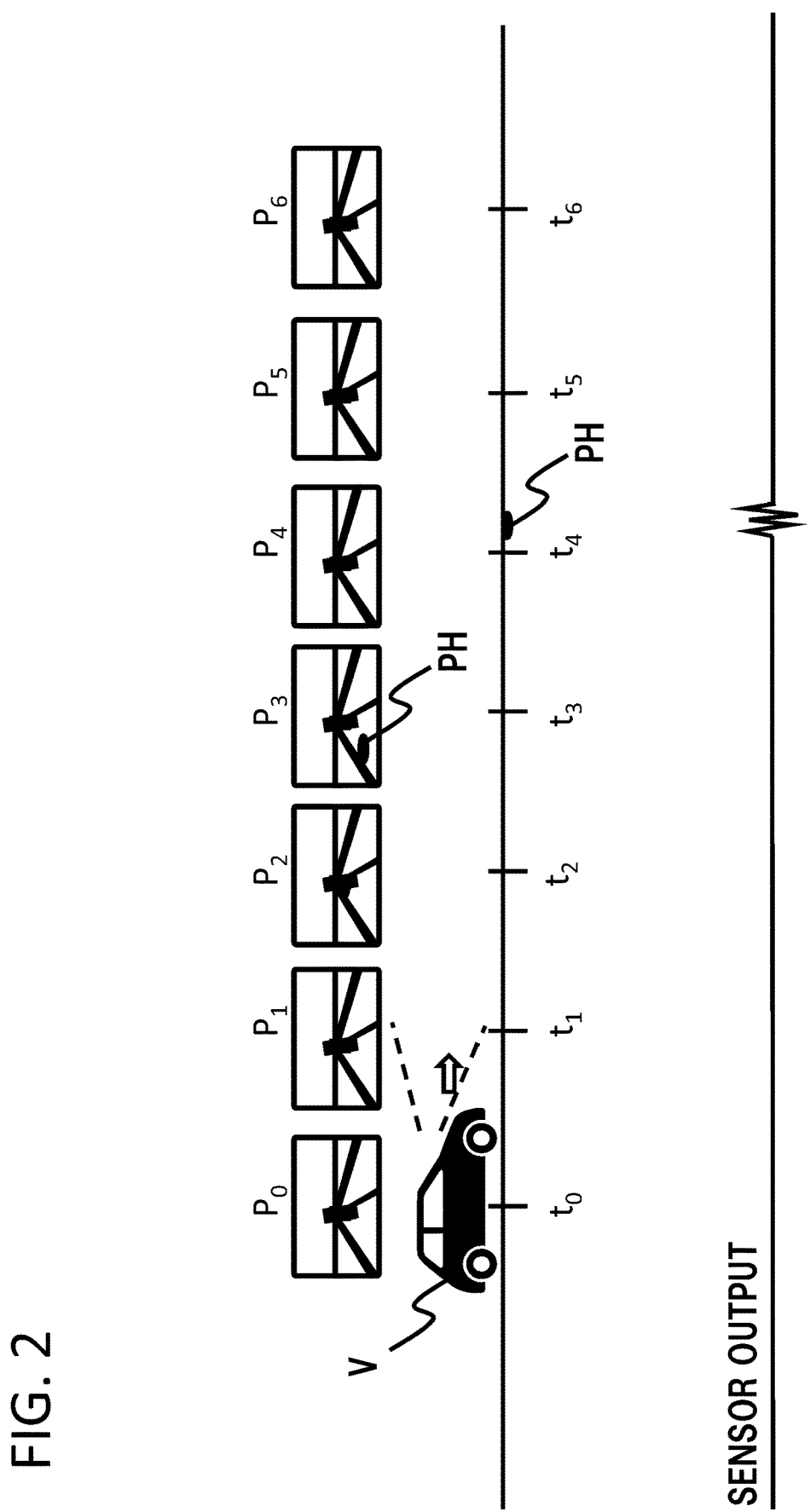
FIG. 2 is a diagram illustrating an operation according to the example embodiment of the present invention.

FIG. 2 is a diagram illustrating an example of an operation of the on-vehicle apparatus 20 according to the example embodiment. Images $P_0$ to $P_6$ are images shot by the camera 21 at times $t_0$ to $t_6$, respectively, while a vehicle V runs from left to right in FIG. 2. Because the camera 21 mounted on the vehicle V is shooting in the forward direction, an image $P_i$ shot at a time $t_i$ includes a road surface on which the vehicle V is to pass after a time $t_{i+1}$. In other words, if an abnormality is detected on a road surface at the time $t_i$, this road surface is included in an image before a time $t_{i-1}$.

In the example in FIG. 2, a pothole PH is present in the section that the vehicle V runs between the times $t_4$ and $t_5$. For example, if an acceleration sensor that measures the acceleration in the vertical direction is used as the sensor, the presence of the pothole PH can be detected based on change in the acceleration in the vertical direction when the tires of the vehicle V pass on the pothole PH after the time $t_4$. However, the image shot at the time $t_5$ immediately after the pothole PH has been detected is $P_5$ and the pothole PH is not included in the image $P_5$.

Thus, the on-vehicle apparatus 20 according to the present example embodiment determines a road section (between the times $t_4$ and $t_5$) having a road surface on which an abnormality is probably present, based on an output value of the sensor 22. Furthermore, the on-vehicle apparatus 20 selects the image $P_3$ including the road surface of the determined road section (between the times $t_4$ to $t_5$) most closely from a plurality of images shot by the camera 21. Next, the on-vehicle apparatus 20 transmits the selected image $P_3$ to a predetermined server. In this way, the predetermined server is able to acquire the presence of the pothole PH and the image of the pothole PH as a set.

According to the present example embodiment as described above, it is possible to facilitate diagnosis of an abnormality on a road based on an image received from a vehicle. This is because the present example embodiment employs a configuration to transmit an image accurately including an abnormality in addition to whether or not there is an abnormality on a road to a predetermined server.

Figure 3:
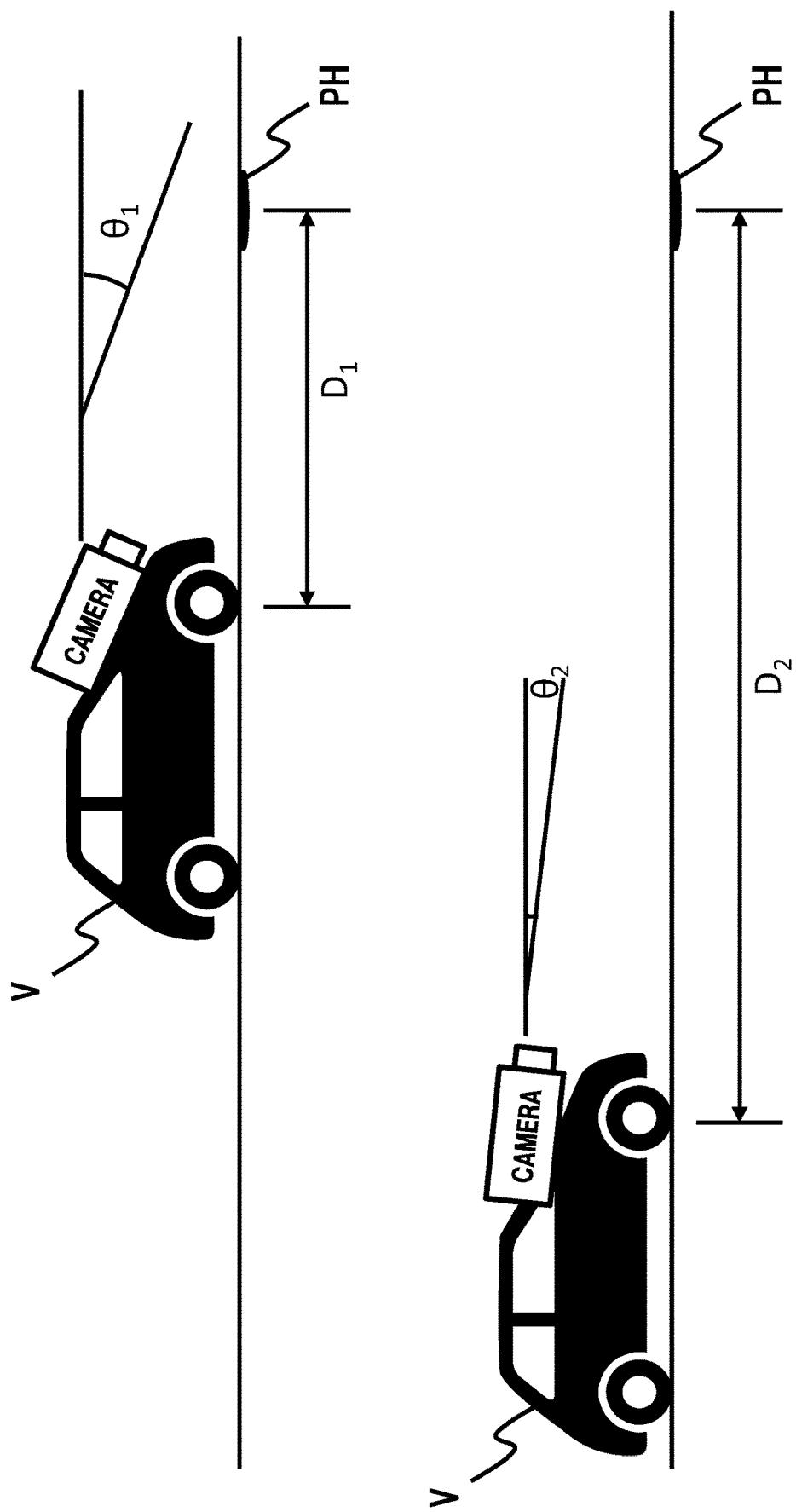
FIG. 3 is a diagram illustrating an operation according to the example embodiment of the present invention.

The rule about selecting the image including the determined road section from the plurality of images is not limited to the example in FIG. 2. The rule is determined based on the location and the angle of view of the camera 21 mounted on the vehicle V. For example, as illustrated by the upper part in FIG. 3, when the camera 21 is installed with the angle of depression $\theta_1$, the distance between the shooting location of the image including the pothole PH and the location of the pothole PH is expressed by $D_1$. When the angle of depression of the camera 21 is $\theta_2$, which is less than $\theta_1$, the distance between the shooting location of the image including the pothole PH and the location of the pothole PH is $D_2$, which is greater than $D_1$. Thus, the image selection part 24 can select an image including a road section having a road surface on which an abnormality is probably present, by selecting a past image by a traveling time of the distance $D_1$ ($D_2$) determined by the location and the angle of view of the camera 21. As described above, since the rule about selecting the image including the determined road section from the plurality of images changes depending on the installation location and the angle of view of the camera of the vehicle V, the rule needs to be set appropriately per vehicle.

First Example Embodiment

Figure 4:
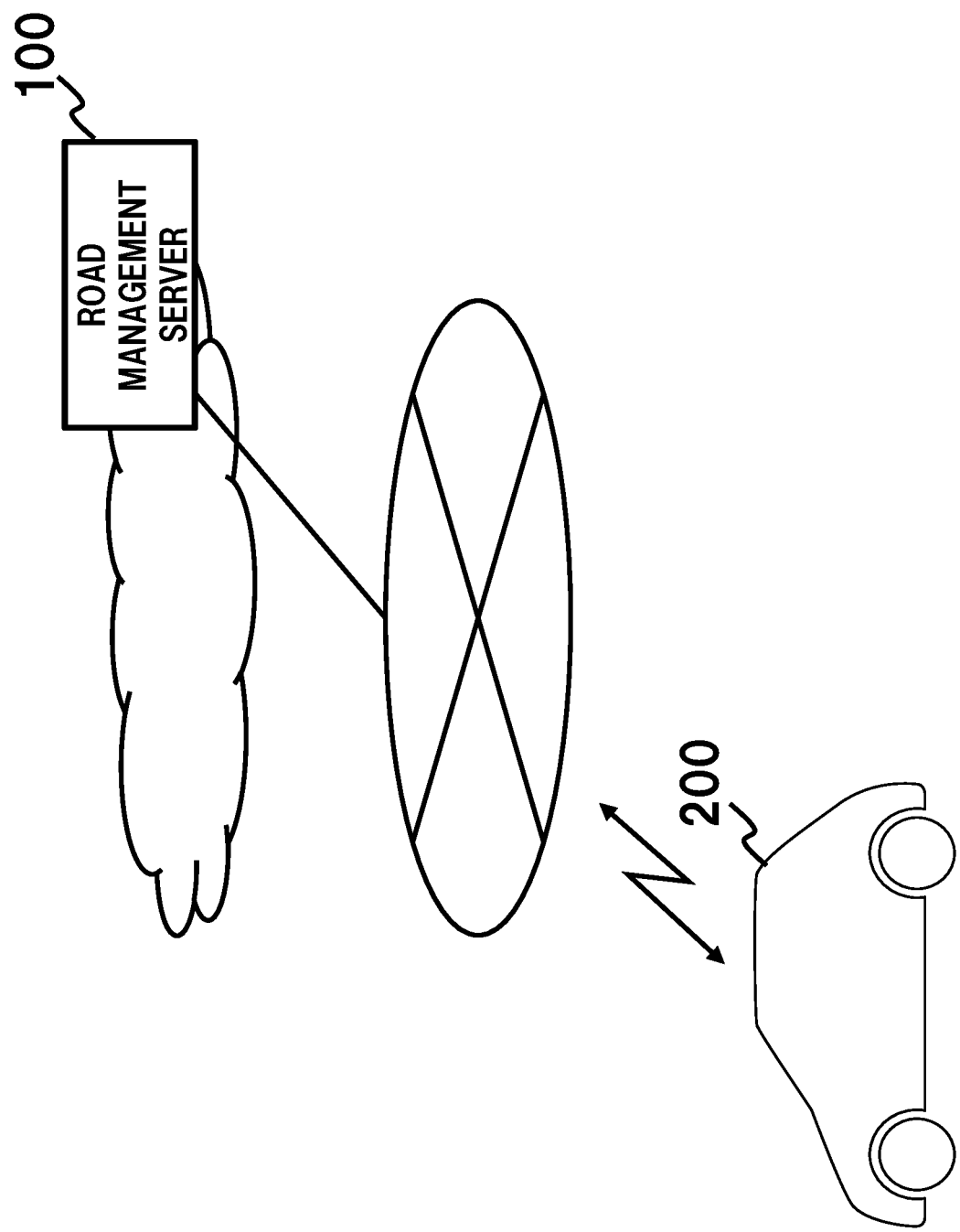
FIG. 4 is a diagram illustrating a configuration according to a first example embodiment of the present invention.

Next, a first example embodiment of the present invention will be described in detail with reference to drawings. FIG. 4 is a diagram illustrating a configuration according to the first example embodiment of the present invention. With reference to FIG. 4, a configuration in which a road management server 100 and a vehicle 200 on which an on-vehicle apparatus is mounted are connected to each other via a network is illustrated. Note that although a single vehicle 200 is illustrated in the example in FIG. 4, a plurality of vehicles 200 may transmit images to the road management server 100.

The road management server 100 receives an image of a road on which an abnormality has been observed from the vehicle 200, and a road administrator is allowed to view the image. With reference to this image, the road administrator determines whether to repair the road or create a long-term repair plan. In addition, if the vehicle 200 has a road inspection function and a function of transmitting measured data about the crack ratio, the rut amount, the IRI (International Roughness Index), etc., the road management server 100 may manage and analyze these data.

Figure 5:
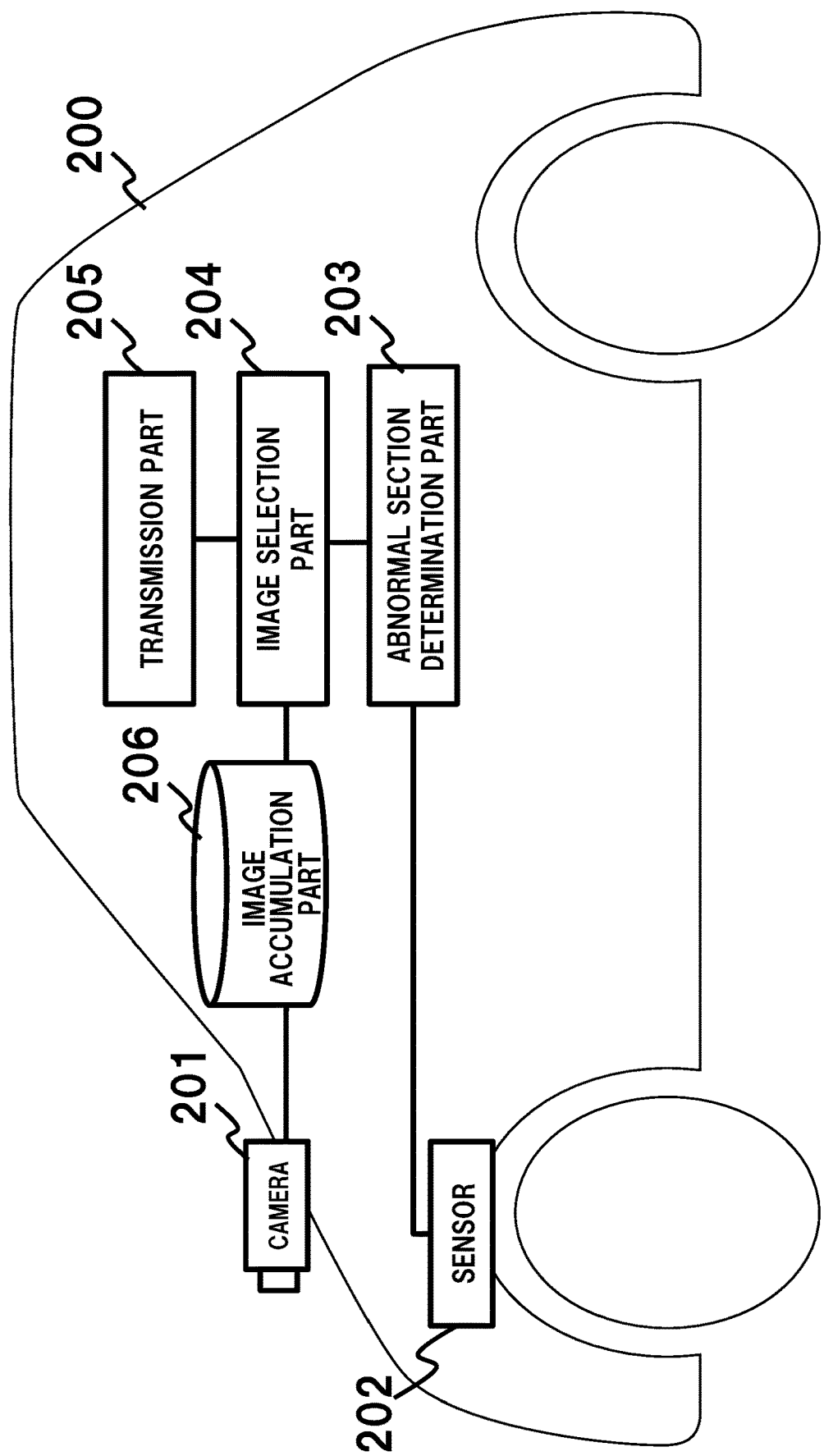
FIG. 5 is a functional block diagram illustrating a configuration of a vehicle on which an on-vehicle apparatus according to the first example embodiment of the present invention is mounted.

FIG. 5 is a functional block diagram illustrating a configuration of the vehicle on which the on-vehicle apparatus according to the first example embodiment of the present invention is mounted. With reference to FIG. 5, a configuration of the vehicle 200 which includes a camera 201, a sensor 202, an abnormal section determination part 203, an image selection part 204, a transmission part 205, and an image accumulation part 206 is illustrated. The on-vehicle apparatus may be configured to include the abnormal section determination part 203, the image selection part 204, and the transmission part 205 of all the above components. Of course, at least one of the camera 201, the sensor 202, and the image accumulation part 206 may be included in the on-vehicle apparatus.

The camera 201 is a camera that shoots images of a road surface ahead of the vehicle at predetermined time intervals. The type of the camera 201 may be selected according to the type of the road abnormality to be detected. Thus, the camera 201 may be an optical camera that shoots images in the visible light range, an infrared camera, and a TOF (Time of Flight) camera that can measure a distance by using light reflection time.

The sensor 202 is a sensor that can measure at least one of the speed, the acceleration, and the number of revolutions of a tire of the vehicle 200. The present example embodiment will be described assuming that a sensor that can measure the acceleration in the vertical direction (Z direction) of the vehicle 200 is used. Note that as this acceleration sensor, an acceleration sensor for measurement of the IRI may be used.

Figure 6:
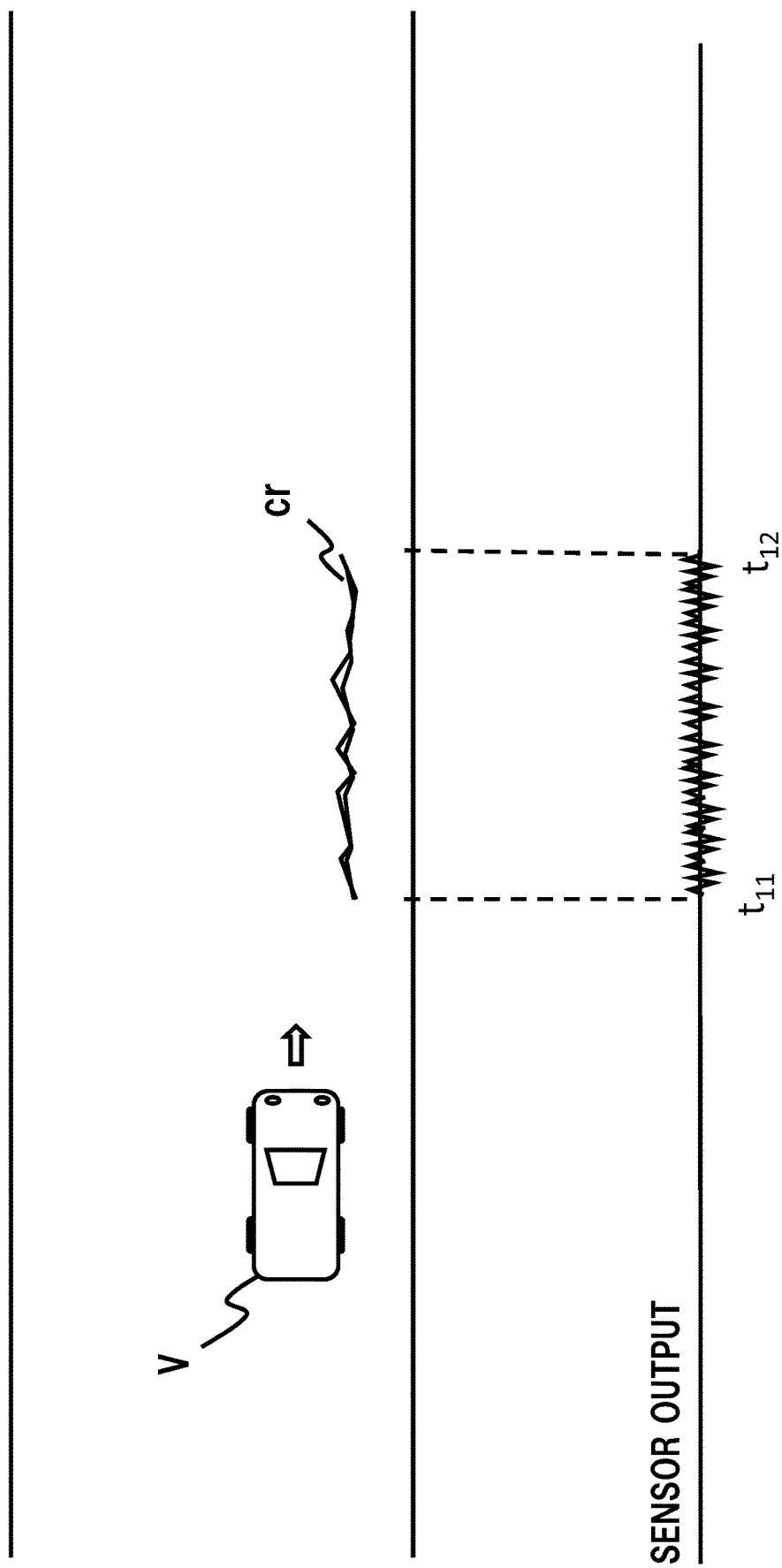
FIG. 6 is a diagram illustrating an operation of an abnormal section determination part of the on-vehicle apparatus according to the first example embodiment of the present invention.

The abnormal section determination part 203 determines an abnormal section on a road, based on change in the acceleration measured by the sensor 202. FIG. 6 is a diagram illustrating an operation of the abnormal section determination part 203. As illustrated by the upper part in FIG. 6, when there is a crack cr in a road surface ahead of the vehicle V running on a road, the vibration transmitted via the tires is measured by the sensor 202. Sections $t_{11}$ to $t_{12}$ in which the vibration is caused and the observation time of the vibration can be determined as an abnormal section.

The image accumulation part 206 accumulates the images shot by the camera 201 for a predetermined period. FIG. 7 is a diagram illustrating an example of image information accumulated in the image accumulation part 206. In the example in FIG. 7, the images shot by the camera 201 are accumulated per second. Note that because the image accumulation part 206 has a limited storage capacity, each image will be deleted from the image accumulation part 206 after the elapse of a certain time.

The image selection part 204 selects an image including an abnormal section determined by the abnormal section determination part 203 from the images accumulated in the image accumulation part 206 and transmits the selected image to the transmission part 205. The image including the abnormal section is a past image of a location of a tire when the sensor has observed the abnormality. Thus, the image selection part 204 can select the image including the abnormal section determined by the abnormal section determination part 203, by extracting an image a period of time ago corresponding to the traveling time of a predetermined distance from the observation time when the sensor 202 has observed the abnormal value corresponding to the abnormal section. As described above, the image of the location of the tire when the sensor has observed the abnormality can be obtained by selecting a past image by a time calculated based on the distance $D_1$ ($D_2$) according to the location and the angle of depression of the camera 201 and the vehicle speed (see FIG. 3). For example, if the vehicle V takes N seconds to run the distance $D_1$ ($D_2$), it is possible to select an image including the crack cr in FIG. 6 by selecting a past image shot N seconds ago from the time when the sensor has observed an abnormality. Furthermore, when selecting the above past image, the time that is needed to observe (detect) the abnormality may be taken into account. When let the time needed to observe (detect) the abnormality be n, it is possible to select the image including the crack cr in FIG. 6 by selecting a past image shot N+n seconds ago from the time when the sensor has observed the abnormality. In addition, if there is a continuous abnormality such as the crack cr in FIG. 6, a plurality of images corresponding to the length of the crack may be selected by continuously performing image selection operation by the image selection part.

Although the above example has been described assuming that an image including an abnormal section is selected by using the image shooting time, the image may be determined by using location information. In this case, the abnormal section determination part 203 needs to determine an abnormal section by using a combination of items of location information such as the latitude and the longitude obtained by a GPS (Global Positioning System). In addition, the images shot by the camera 201 need to be associated with their respective location information obtained by the GPS. In this case, the image selection part 204 uses, for example, location information about the target object (road), to select an image including an abnormal section determined by a combination of items of location information.

The transmission part 205 transmits the selected image to the road management server 100. The transmission part 205 and the network may be connected to each other via a wireless communication network provided by a mobile network operator or via a roadside device installed near the road.

Figure 8:
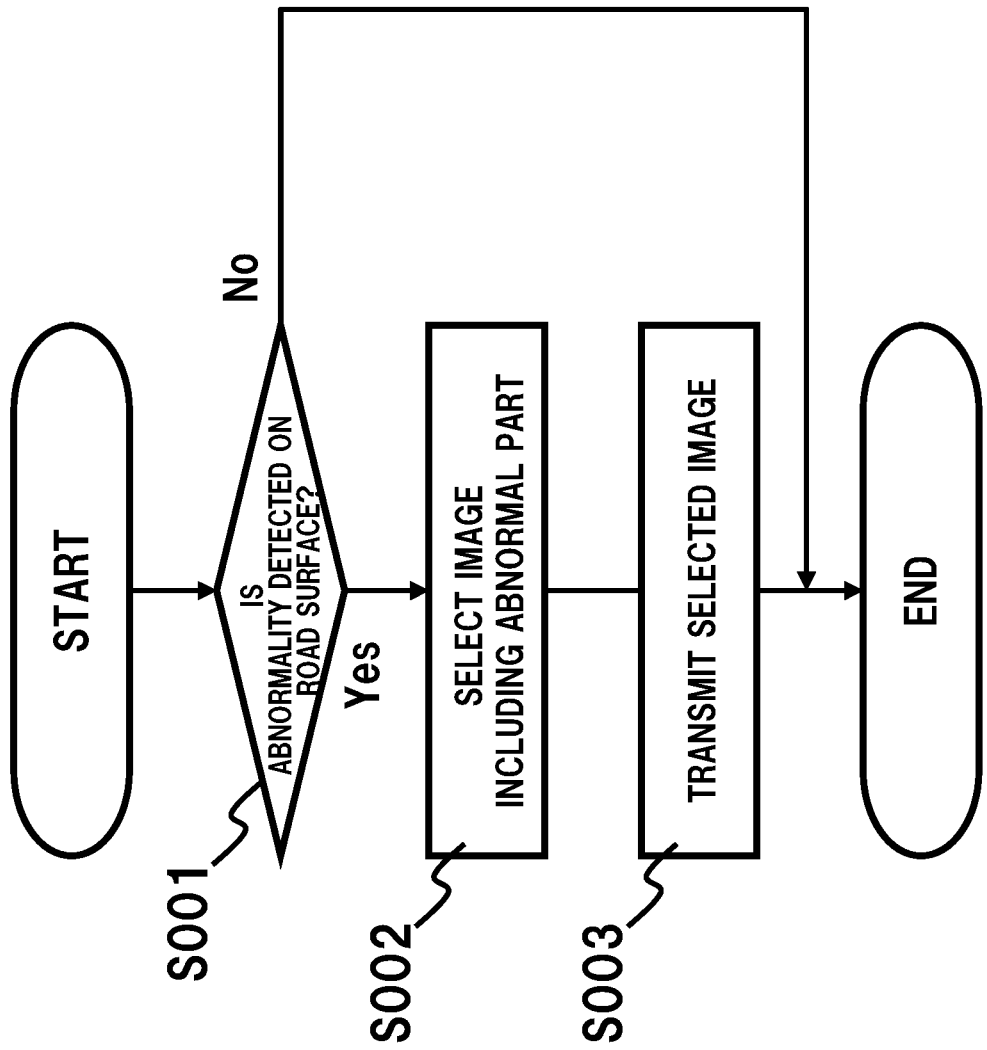
FIG. 8 is a flowchart illustrating an operation of the on-vehicle apparatus according to the first example embodiment of the present invention.

Next, an operation according to the present example embodiment will be described in detail with reference to a drawing. FIG. 8 is a flowchart illustrating an operation of the on-vehicle apparatus according to the first example embodiment of the present invention. In the following description, it is assumed that images are shot by the camera 201 at predetermined time intervals and are accumulated in the image accumulation part 206. The on-vehicle apparatus mounted on the vehicle 200 performs a process illustrated in FIG. 8 at predetermined time intervals. First, the abnormal section determination part 203 in the on-vehicle apparatus checks whether there is an abnormality on a road surface based on the measured value of the sensor 202 (step S001).

If it is determined that there is an abnormality on the road surface (Yes in step S001), the image selection part 204 selects an image including the road surface on which the presence of the abnormality has been determined from the images accumulated in the image accumulation part 206 (step S002). If it is determined that there is no abnormality on the road surface (No in step S001), the on-vehicle apparatus skips the following process.

If it is determined that there is an abnormality on the road surface, the image selection part 204 selects an image including the road surface on which the presence of the abnormality has been determined from the images accumulated in the image accumulation part 206 (step S002).

Finally, the transmission part 205 transmits the selected image to the road management server 100 (step S003). For example, if the vehicle V runs on the section including the crack cr in FIG. 6, the on-vehicle apparatus continuously transmits images of the road surface including the crack cr.

As described above, according to the present example embodiment, it becomes possible not only to detect presence or absence of an abnormality on a road surface but also to transmit an image including a road surface on which an abnormality is present to the road management server 100. In this way, a road administrator or the like does not need to dispatch personnel to the site in question, whereby diagnosis of an abnormality on a road is facilitated.

Second Example Embodiment

Figure 9:
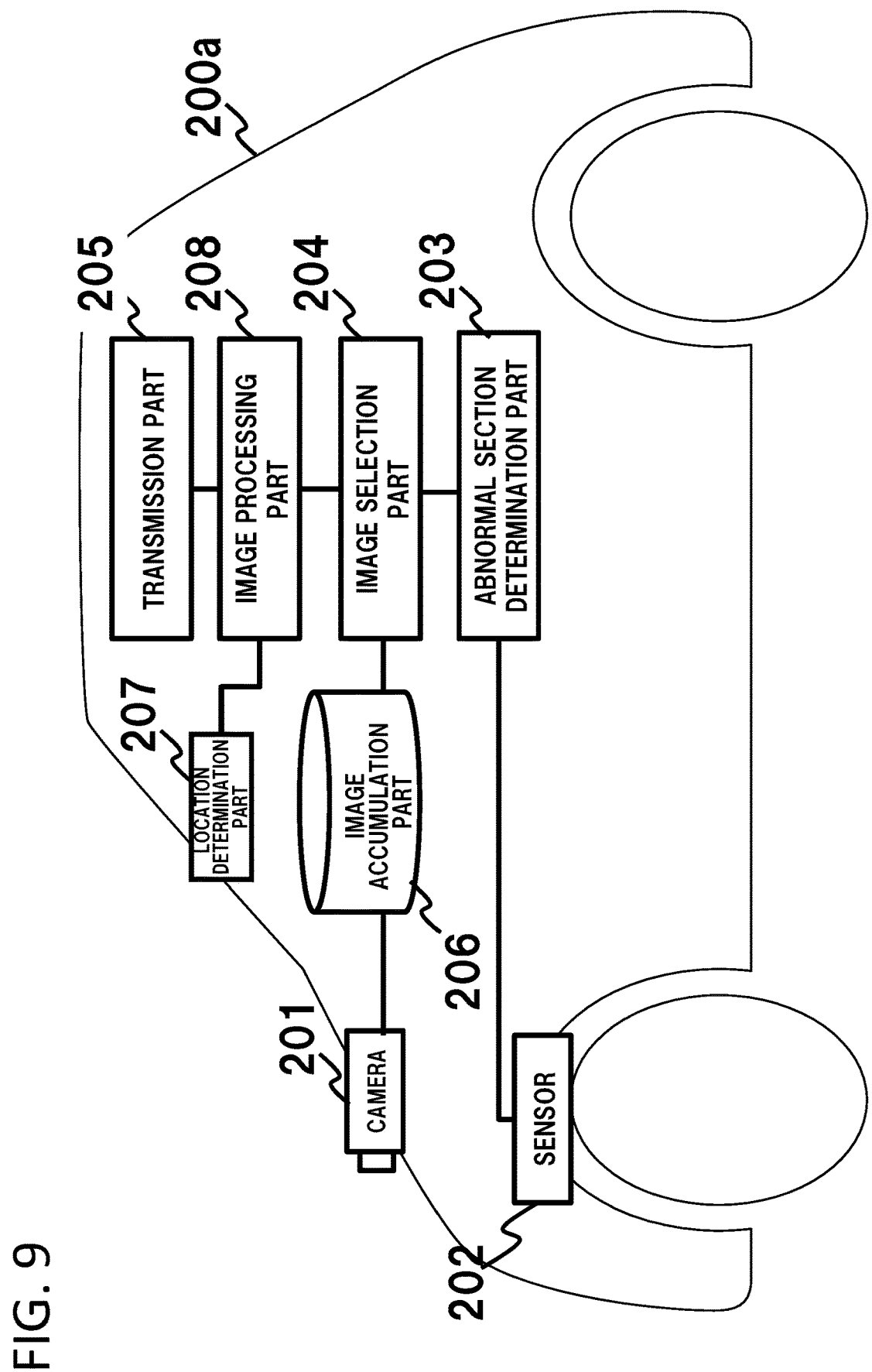
FIG. 9 is a functional block diagram illustrating a configuration of a vehicle on which an on-vehicle apparatus according to a second example embodiment of the present invention is mounted.

Next, a second example embodiment will be described. In the second example embodiment, information that further facilitates diagnosis of an abnormality on a road is added to an image transmitted by an on-vehicle apparatus. FIG. 9 is a functional block diagram illustrating a configuration of a vehicle on which an on-vehicle apparatus according to the second example embodiment of the present invention is mounted. The present configuration differs from the configuration according to the first example embodiment illustrated in FIG. 5 in that a vehicle 200a further includes a location determination part 207 and an image processing part 208. In the other aspects, the configuration is similar to the configuration according to the first example embodiment, and therefore, the following description will be made with a focus on the difference.

The location determination part 207 is configured to include a GPS module and determines the location of the vehicle 200a.

The image processing part 208 first performs a process for adding location information of the vehicle 200a itself determined by the location determination part 207 to an image selected by an image selection part 204 and next transmits the processed image to the transmission part 205.

Figure 10:
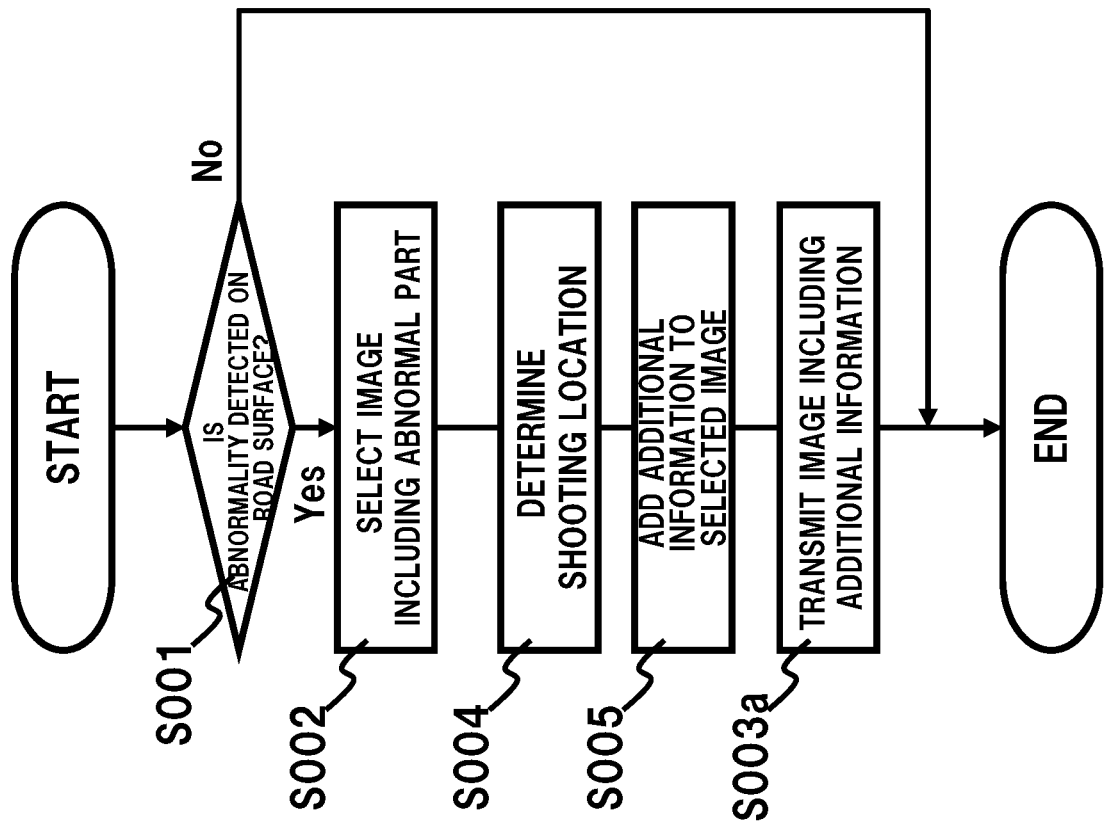
FIG. 10 is a flowchart illustrating an operation of the on-vehicle apparatus according to the second example embodiment of the present invention.

Next, an operation according to the present example embodiment will be described in detail with reference to a drawing. FIG. 10 is a flowchart illustrating an operation of the on-vehicle apparatus according to the second example embodiment of the present invention. The present operation differs from the operation of the on-vehicle apparatus according to the first example embodiment illustrated in FIG. 8 in that image processing is added after selection of an image including an abnormal part in step S002. The following description will be made with a focus on the difference.

After the image selection part 204 selects an image including a road surface on which the presence of an abnormality has been determined from the images accumulated in the image accumulation part 206 (step S002), the image selection part 204 outputs the selected image to the image processing part 208. The image processing part 208 requests the location determination part 207 to determine the current location of the vehicle 200a and receives location information about the vehicle 200a (step S004).

Next, the image processing part 208 adds, as additional information, the location information about the vehicle 200a itself to the image selected by the image selection part 204 in step S002 (step S005).

Finally, the transmission part 205 transmits the processed image to the road management server 100 (step S003a).

Figure 11:
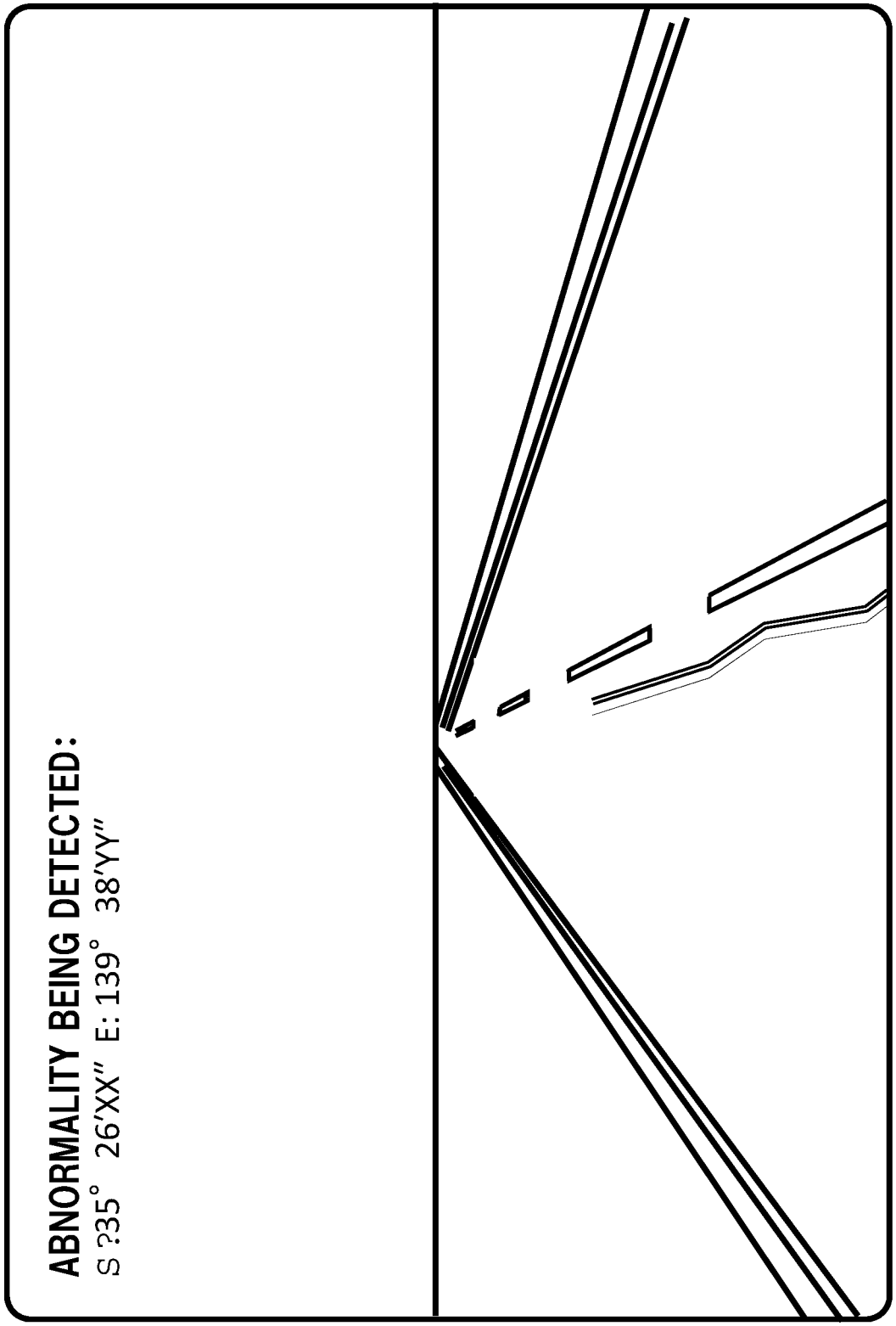
FIG. 11 is a diagram illustrating an example of an image created by the on-vehicle apparatus according to the second example embodiment of the present invention.

FIG. 11 is a diagram illustrating an example of an image created by the on-vehicle apparatus according to the present example embodiment. In the example in FIG. 11, text "abnormality being detected" and location information (latitude and longitude information) about the vehicle are added on the top left corner of the image of the road having a crack. This location information is the location at which the sensor has detected the abnormality, not the location at which the image has been shot. Thus, it is fair to say that the location information substantially indicates the location of the abnormal part of the road. By providing a road administrator with an image to which such location information (latitude and longitude information) has been added, the location of the road having a crack can be more easily grasped.

Figure 12:
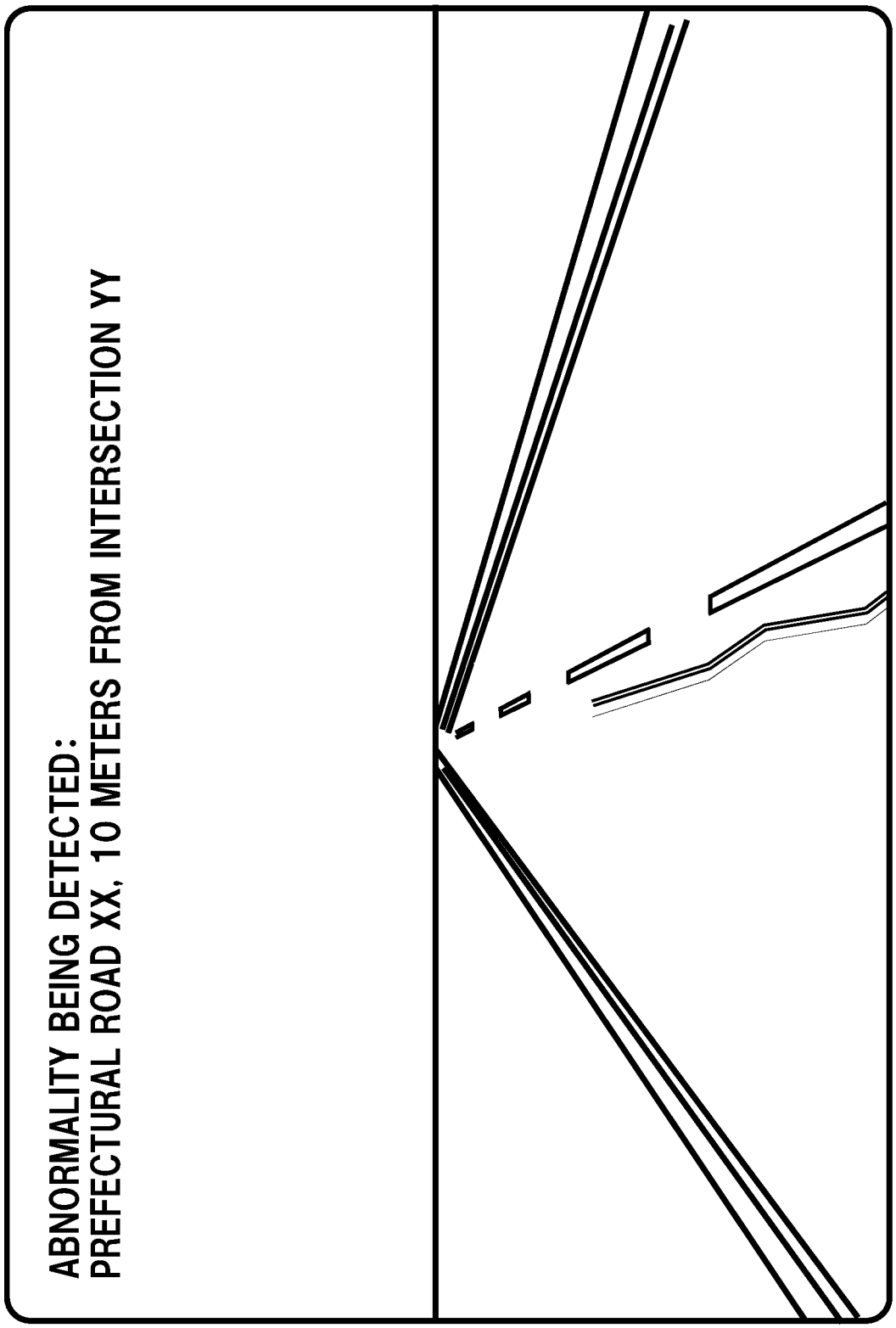
FIG. 12 is a diagram illustrating another example of the image created by the on-vehicle apparatus according to the second example embodiment of the present invention.

The mode in which the location information is added to the image is not limited to the example in FIG. 11. For example, as illustrated in FIG. 12, in place of the latitude and longitude information, location information such as information about the road having the detected abnormality (prefectural road XX) and location information on the road (10 meters from intersection YY) may be added. Such location information can be created by determining the targe road and its relative location from latitude and longitude information by using map information or the like, for example.

Third Example Embodiment

Figure 13:
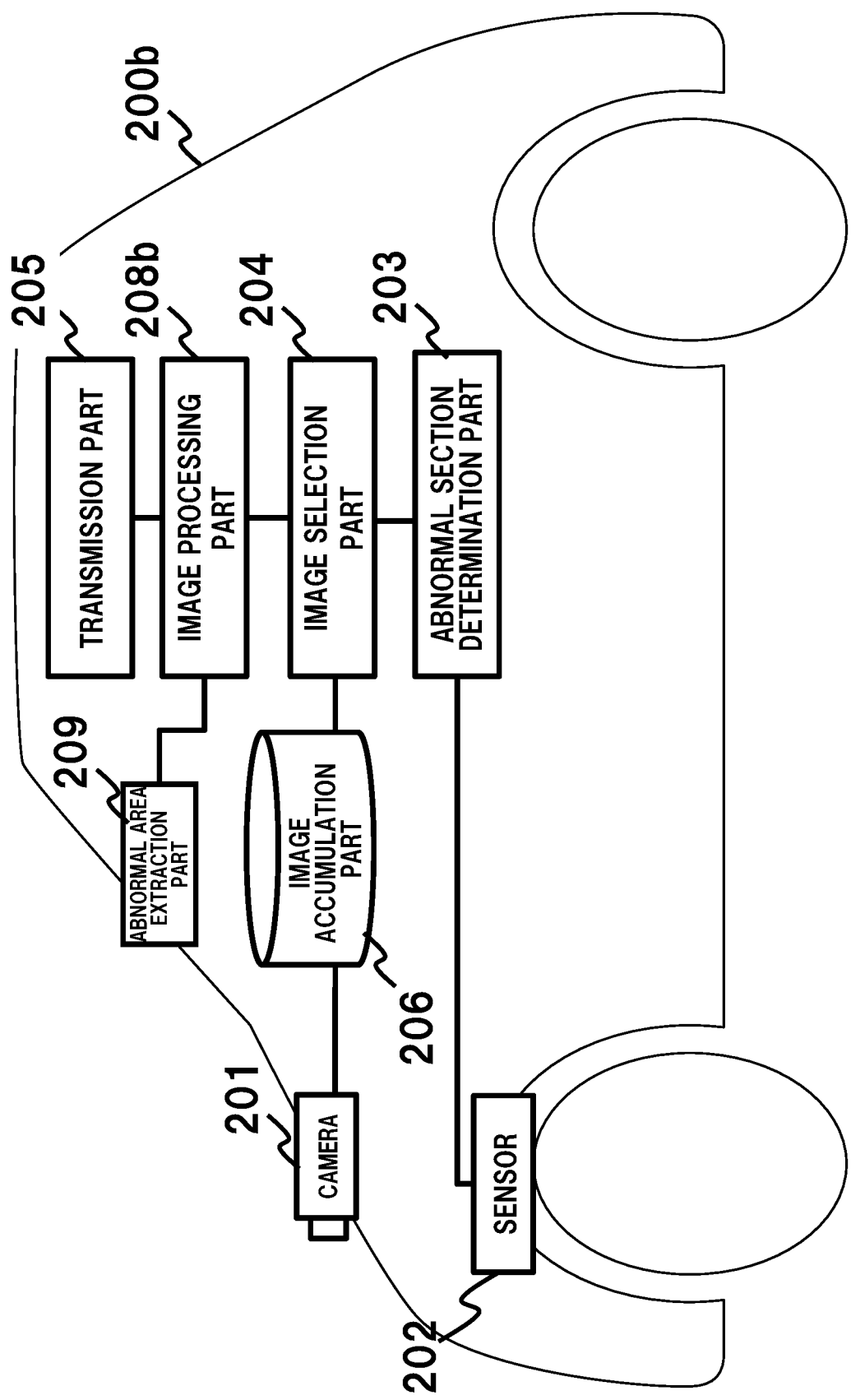
FIG. 13 is a functional block diagram illustrating a configuration of a vehicle on which an on-vehicle apparatus according to a third example embodiment of the present invention is mounted.

Next, a third example embodiment will be described. In the third example embodiment, information that facilitates determination of an abnormal part is added to an image transmitted by an on-vehicle apparatus. FIG. 13 is a functional block diagram illustrating a configuration of a vehicle on which an on-vehicle apparatus according to the third example embodiment of the present invention is mounted. The present configuration differs from the configuration according to the first example embodiment illustrated in FIG. 5 in that a vehicle 200b further includes an abnormal area extraction part 209 and an image processing part 208b. In the other aspects, the configuration is similar to that according to the first example embodiment, and therefore, the following description will be made with a focus on the difference.

When receiving an image from the image processing part 208b, the abnormal area extraction part 209 determines an area in which an abnormality is present in the road in the image by using a previously created area detector and outputs information about the area in which the abnormality is present in the road in the image to the image processing part 208b. For example, the area detector can be created by preparing a training data set including prepared road images and abnormality modes as labels and by performing machine learning.

The image processing part 208b gives an image selected by an image selection part 204 to the abnormal area extraction part 209 and requests to determine an area in which the abnormality is present in the road in the image. When receiving information about an area in which the abnormality is present in the road in the image from the abnormal area extraction part 209, the image processing part 208b highlights the area in which the abnormality is present in the road in the image selected by the image selection part 204. Next, the image processing part 208b gives the processed image to a transmission part 205.

Figure 14:
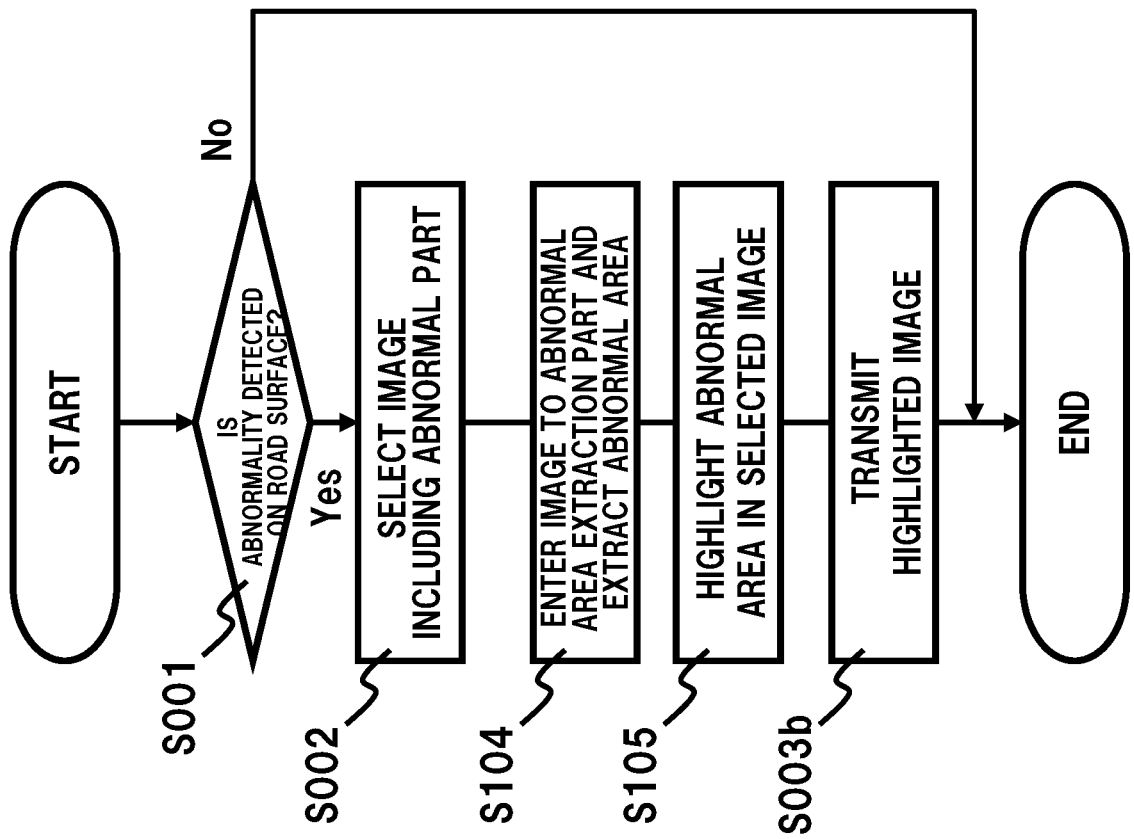
FIG. 14 is a flowchart illustrating an operation of the on-vehicle apparatus according to the third example embodiment of the present invention.

Next, an operation according to the present example embodiment will be descried in detail with reference to a drawing. FIG. 14 is a flowchart illustrating an operation of the on-vehicle apparatus according to the third example embodiment of the present invention. The present operation differs from the operation of the on-vehicle apparatus according to the first example embodiment illustrated in FIG. 8 in that image processing is added after selection of an image including an abnormal part in step S002. The following description will be made with a focus on the difference.

After the image selection part 204 selects an image including a road surface on which the presence of an abnormality has been determined from the images accumulated in an image accumulation part 206 (step S002), the image selection part 204 outputs the selected image to the image processing part 208b. The image processing part 208b requests the abnormal area extraction part 209 to determine an area in which the abnormality is present in the road in the image received from the image selection part 204 and receives information about the area in which the abnormality is present in the road in the image from the abnormal area extraction part 209 (step S104).

Next, by using the information about the area in which the abnormality is present in the road in the image, the image processing part 208b highlights the area in which the abnormality is present in the road in the image selected by the image selection part 204 in step S002 (step S105).

Finally, a transmission part 205 transmits the processed (highlighted) image to the road management server 100 (step S003b).

Figure 15:
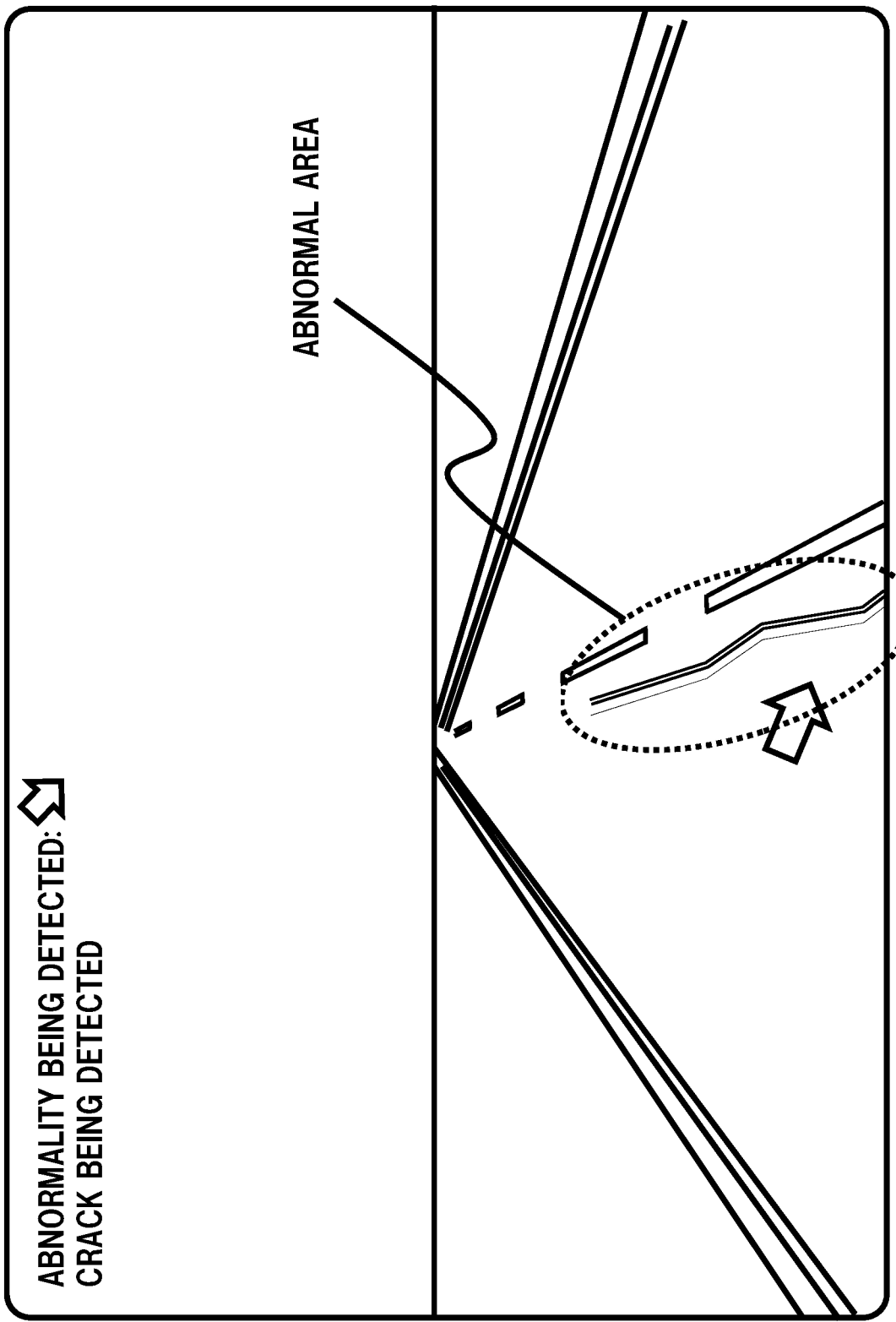
FIG. 15 is a diagram illustrating an example of an image created by the on-vehicle apparatus according to the third example embodiment of the present invention.
Figure 16:
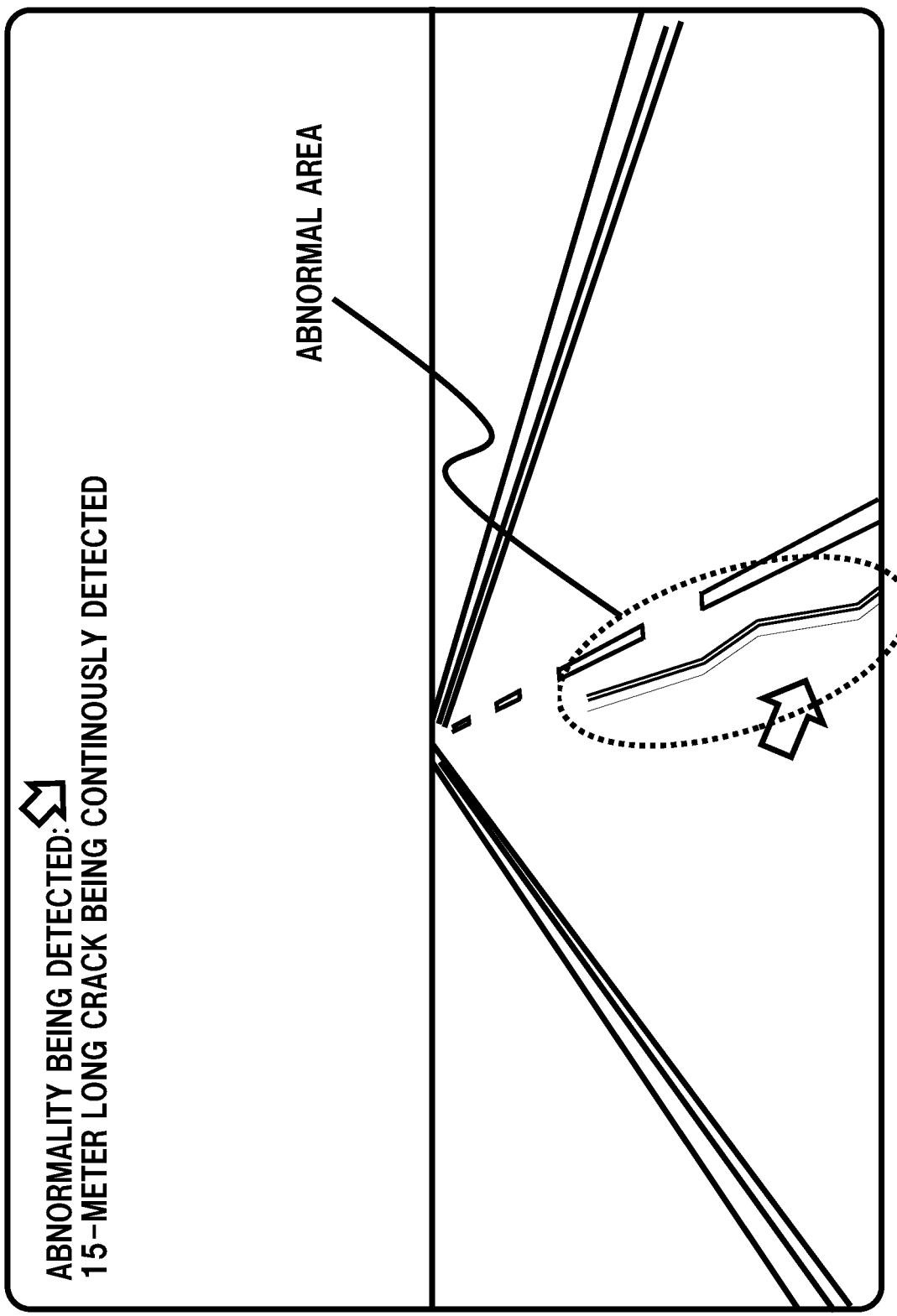
FIG. 16 is a diagram illustrating another example of the image created by the on-vehicle apparatus according to the third example embodiment of the present invention.

FIGS. 15 and 16 are diagrams each illustrating an example of an image created by the on-vehicle apparatus according to the present example embodiment. In the example in FIG. 15, an arrow indicating a crack part and a dotted line surrounding the crack part are added in an image of a road having the crack. By providing a road administrator with an image including such highlighting, the area having a crack in the image can be grasped more easily. In the example in FIG. 16, the length of the section in which a crack has been detected, that is, text "15-meter long crack being detected", is displayed, in addition to the information in FIG. 15.

Notte that the process for highlighting an area including an abnormality is not limited to the examples in FIGS. 15 and 16. For example, a process for emphasizing the outline of a crack portion or a process for coloring a crack portion may be performed.

While example embodiments of the present invention have thus been described, the present invention is not limited thereto. Further variations, substitutions, or adjustments can be made without departing from the basic technical concept of the present invention. For example, the configurations of the system and elements and the representation modes of the data illustrated in the drawings have been used only as examples to facilitate understanding of the present invention. That is, the present invention is not limited to the configurations illustrated in the drawings.

For example, the above example embodiments have been described based on an example in which the sensor 202 is an acceleration sensor. However, information obtained by one of various kinds of instruments equipped with the vehicle may be used as the information obtained by the sensor 202. For example, when a vehicle runs on an abnormal portion such as a crack on a road surface, reduction on-vehicle speed due to increase in the rolling friction or increase in acceleration pedal depression amount are observed. The abnormal section determination part 203 may determine an abnormal section on a road using such change. Similarly, when a vehicle runs on an abnormal portion such as a crack on a road surface, reduction in a number of revolutions of a tire due to increase in the rolling friction or increase in acceleration pedal depression amount are observed. The abnormal section determination part 203 may determine an abnormal section on a road using such change. In addition, in this case, it is preferable that a running state information indicating a running state of the vehicle 200 (the vehicle speed, the acceleration, the shift position, the engine speed, the acceleration pedal depression amount, and the like) be added to the image transmitted by the transmission part 205. By providing a road administrator with such a running state, the abnormal portion such as a crack on a road surface can be determined more easily.

In addition, although each of the above example embodiments has been described based on an example in which an abnormality on a road surface is a pothole or a crack, examples of the abnormality on the road surface are not limited to a pothole and a crack. The present invention is applicable to any road surface abnormalities that can be detected by a sensor(s) of the vehicle.

Figure 17:
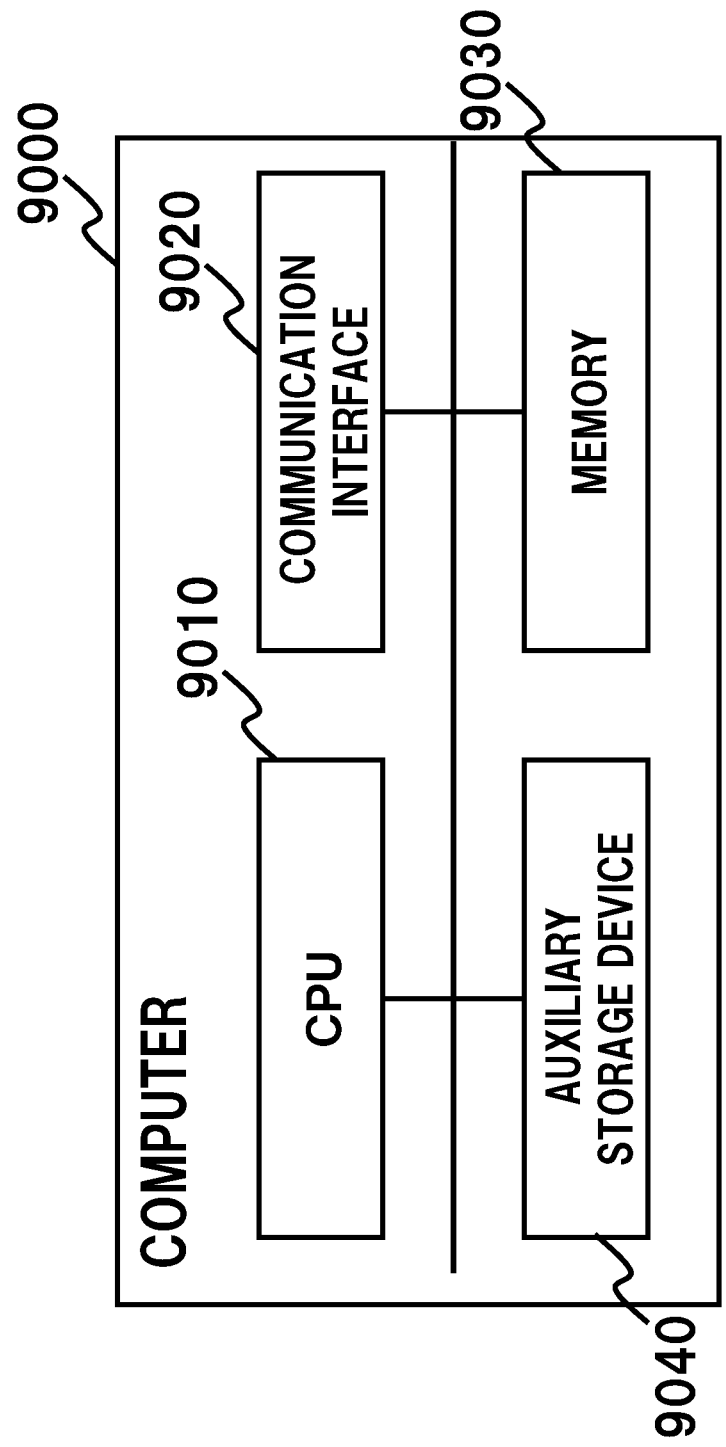
FIG. 17 is a diagram illustrating a configuration of a computer mounted on a vehicle according to the present invention.

In addition, the procedures described in the above first to third example embodiments can each be realized by a program causing a computer (9000 in FIG. 17) functioning as the corresponding on-vehicle apparatus to realize the functions as the corresponding on-vehicle apparatus. For example, this computer is configured to include a CPU (Central Processing Unit) 9010, a communication interface 9020, a memory 9030, and an auxiliary storage device 9040 in FIG. 17. That is, the CPU 9010 in FIG. 17 executes an abnormality section determination processing program and an image selection program to perform processing for updating various calculation parameters stored in the auxiliary storage device 9040, etc.

That is, the individual parts (processing means, functions) of each of the apparatuses according to the above first to third example embodiments can each be realized by a computer program that causes a processor mounted on the corresponding apparatus to execute the corresponding processing described above by using corresponding hardware.

Finally, suitable modes of the present invention will be summarized.

[Mode 1]

(See the on-vehicle apparatus according to the above first aspect)

[Mode 2]

The image selection part of the on-vehicle apparatus may have a configuration to select the image(s) including the determined road section by selecting an image(s) including a location(s) of a tire(s) at a time when the sensor has observed the abnormality from the images shot by the camera on the vehicle.

[Mode 3]

The image selection part of the on-vehicle apparatus may have a configuration to select the image(s) including the location(s) of the tire(s) at the time when the sensor has observed the abnormality by selecting a past image(s) by a time(s) corresponding to a traveling time(s) of a distance(s) determined based on a location of the camera on the vehicle and an angle of view of the camera.

[Mode 4]

The on-vehicle apparatus may have a configuration in which the sensor is a sensor that measures at least one of a speed, an acceleration, and a number of revolutions of a tire, and the abnormal section determination part determines the section having the road surface on which the abnormality is probably present, based on a change pattern of the output value of the sensor.

[Mode 5]

The on-vehicle apparatus may have a configuration to further include an image processing part that adds information about the determined road section to the image(s) transmitted to the predetermined server, and may have a configuration in which the transmission part transmits the processed image(s) to the predetermined server.

[Mode 6]

The image processing part of the on-vehicle apparatus may have a configuration to add information indicating a location at which the image(s) selected by the image selection part has been shot.

[Mode 7]

The on-vehicle apparatus may have a configuration to include an abnormal area extraction part that extracts an abnormal area by analyzing the image(s) selected by the image selection part, and may have a configuration in which the image processing part performs a process for highlighting the area extracted by the abnormal area extraction part.

[Mode 8]

The on-vehicle apparatus may include a function of adding information indicating a running state of the vehicle to the image(s) transmitted to the predetermined server.

[Mode 9]

(See the road surface image transmission method according to the above second aspect)

[Mode 10]

(See the program according to the above third aspect)

The above modes 9 and 10 can be expanded to modes 2 to 8 in the same way as mode 1 is expanded.

The disclosure of each of the above PTLs is incorporated herein by reference thereto and may be used as the basis or a part of the present invention, as needed. Modifications and adjustments of the example embodiments or examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be construed to have been concretely disclosed. In addition, as needed and based on the gist of the present invention, the individual disclosed matters in the above literatures and partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST 20 on-vehicle apparatus
21, 201 camera
22, 202 sensor
23, 203 abnormal section determination part
24, 204 image selection part
25, 205 transmission part
100 road management server
200, 200a, 200b, V vehicle
206 image accumulation part
207 location determination part
208, 208b image processing part
209 abnormal area extraction part
PH pothole
Cr crack
9000 computer
9010 CPU
9020 communication interface
9030 memory
9040 auxiliary storage device

What is claimed is:
1. An on-vehicle apparatus, comprising:
at least a processor; and
a memory in circuit communication with the processor, wherein the processor is configured to execute program instructions stored in the memory to implement:

determining a road section having a road surface on which an abnormality is probably present, based on an output value of a sensor mounted on a vehicle;

selecting an image(s) including the determined road section from a plurality of images shot at predetermined time intervals by a camera mounted on the vehicle; and transmitting the selected image(s) to a predetermined server, wherein the selecting the image(s) comprises selecting the image(s) including the determined road section by selecting an image(s) including a location(s) of a tire(s) at a time when the sensor has observed the abnormality from the images shot by the camera on the vehicle, and wherein the selecting the image(s) comprises selecting the image(s) including the location(s) of the tire(s) at the time when the sensor has observed the abnormality by selecting a past image by a traveling time of a distance determined based on a location of the camera on the vehicle and an angle of view of the camera.

2. The on-vehicle apparatus according to claim 1;
wherein the sensor is a sensor that measures at least one of a speed, an acceleration, and a number of revolutions of a tire; and
wherein the determining the road section comprises determining the section having the road surface on which the abnormality is probably present, based on a change pattern of the output value of the sensor.

3. The on-vehicle apparatus according to claim 1, wherein the processor is configured to execute the program instructions to implement:
adding information about the determined road section to the image(s) transmitted to the predetermined server;
wherein the transmitting the selected image(s) comprises transmitting the processed image(s) to the predetermined server.

4. The on-vehicle apparatus according to claim 3; wherein the adding information comprises adding information indicating a location at which the image(s) selected by the image selection part has been shot.

5. The on-vehicle apparatus according to claim 3, wherein the processor is configured to execute the program instructions to implement:
extracting an abnormal area by analyzing the image(s) selected by the image selection part;
wherein the adding information comprises performing a process for highlighting the area extracted by the abnormal area extraction part.

6. The on-vehicle apparatus according to claim 1; wherein information indicating a running state of the vehicle is added to the image(s) transmitted to the predetermined server.

7. A road surface image transmission method performed by an on-vehicle apparatus of a vehicle on which a camera and a sensor are mounted, comprising:
determining a road section having a road surface on which an abnormality is probably present, based on an output value of the sensor;
selecting an image(s) including the determined road section from a plurality of images shot at predetermined time intervals by the camera; and
transmitting the selected image(s) to a predetermined server,
wherein the selecting the image(s) comprises selecting the image(s) including the determined road section by selecting an image(s) including a location(s) of a tire(s) at a time when the sensor has observed the abnormality from the images shot by the camera on the vehicle, and
wherein the selecting the image(s) comprises selecting the image(s) including the location(s) of the tire(s) at the time when the sensor has observed the abnormality by selecting a past image by a traveling time of a distance determined based on a location of the camera on the vehicle and an angle of view of the camera.

8. The road surface image transmission method according to claim 7;
wherein the sensor is a sensor that measures at least one of a speed, an acceleration, and a number of revolutions of a tire; and
wherein the determining the road section comprises determining the section having the road surface on which the abnormality is probably present, based on a change pattern of the output value of the sensor.

9. The road surface image transmission method according to claim 7, further comprising:
adding information about the determined road section to the image(s) transmitted to the predetermined server;
wherein the transmitting the selected image(s) comprises transmitting the processed image(s) to the predetermined server.

10. The road surface image transmission method according to claim 9; wherein the adding information comprises adding information indicating a location at which the image(s) selected by the image selection part has been shot.

11. A recording medium storing a program, the program causing an on-vehicle apparatus of a vehicle on which a camera and a sensor are mounted to perform processing for:
determining a road section having a road surface on which an abnormality is probably present, based on an output value of the sensor;
selecting an image(s) including the determined road section from a plurality of images shot at predetermined time intervals by the camera; and
transmitting the selected image(s) to a predetermined server,
wherein the selecting the image(s) comprises selecting the image(s) including the determined road section by selecting an image(s) including a location(s) of a tire(s) at a time when the sensor has observed the abnormality from the images shot by the camera on the vehicle, and
wherein the selecting the image(s) comprises selecting the image(s) including the location(s) of the tire(s) at the time when the sensor has observed the abnormality by selecting a past image by a traveling time of a distance determined based on a location of the camera on the vehicle and an angle of view of the camera.

12. The recording medium according to claim 11;
wherein the sensor is a sensor that measures at least one of a speed, an acceleration, and a number of revolutions of a tire; and
wherein the determining the road section comprises determining the section having the road surface on which the abnormality is probably present, based on a change pattern of the output value of the sensor.

13. The recording medium storing the program according to claim 11, the program causing the on-vehicle apparatus of the vehicle on which the camera and the sensor are mounted to perform further processing for:
adding information about the determined road section to the image(s) transmitted to the predetermined server;
wherein the transmitting the selected image(s) comprises transmitting the processed image(s) to the predetermined server.

14. The recording medium according to claim 13; wherein the adding information comprises adding information indicating a location at which the image(s) selected by the image selection part has been shot.

* * * * *